Sept. 17, 1963 W. H. MORRISON ETAL 3,104,135
BIMETALLIC BEARING STRUCTURE AND METHOD FOR PRODUCING SAME
Filed Feb. 26, 1960 3 Sheets-Sheet 1

*INVENTOR.*
WILBERT H. MORRISON
RAYMOND L. SLATER
BY
*Eber J. Hyde*
ATTORNEY

United States Patent Office 3,104,135
Patented Sept. 17, 1963

3,104,135
BIMETALLIC BEARING STRUCTURE AND
METHOD FOR PRODUCING SAME
Wilbert H. Morrison, Euclid, and Raymond L. Slater,
Novelty, Ohio, assignors to Clevite Corporation, Cleveland, Ohio, a corporation of Ohio
Filed Feb. 26, 1960, Ser. No. 11,338
17 Claims. (Cl. 308—237)

The present invention relates to a bimetallic bearing structure and to a method for producing same. More particularly the invention contemplates the bonding of a layer of compacted aluminum alloy powder particles to a layer of steel.

A bimetallic strip suitable for the manufacture of bearings must be deformable without causing an interruption of the bond between a soft layer, for instance a layer of compacted powder particles, and a steel strip backing member. Similarly, a bearing must be operable under high temperature conditions, yet must possess sufficient strength to support the bearing load and to resist cracking from metal fatigue.

To provide for such bearing qualities, it is desirable to employ a substantial percentage of low melting point materials, such as lead, tin or cadmium in a soft surface layer and to back-up the layer with a rigid member. Considerable difficulties have been encountered in efforts to provide a substantial amount of low melting point constituents in aluminum bimetallic bearing structures. For instance, when incorporating more than 10% of a given low melting point material into a soft surface layer there is a tendency for the low melting point constituents to accumulate near or adjacent to the interface of the bimetallic strip during a wrought bonding process. Similarly, hot bonding contact between two metals, for instance aluminum base alloys and a steel backing member, may cause a high degree of reaction between the two metals with consequent formation of a brittle intermediate phase of iron aluminum compounds positioned between the layers. This has a substantial brittling effect and tends to fracture the bond upon working or forming the strip.

While the interposition of a third layer metal, for instance such as copper or nickel, may partially overcome some of the hereinbefore mentioned difficulties, by allowing the application of higher temperatures and requiring a correspondingly lower pressure, it will be appreciated that the process has not been simplified. Similarly, it has been found that quantitative restrictions with respect to low melting point materials have not appreciably been removed.

Attempts in the field of powder metallurgy to overcome such difficulties, by producing a commercially suitable bimetallic strip composed of a steel backing member and a layer of compressed powdered particles exhibiting the desired characteristics have equally failed.

It has now been discovered that practically any suitable amount of low melting point constituents may be successfully fabricated into an aluminum alloy powder clad and steel backed bearing, if the application of heat throughout the process is controlled to the extent so as to preclude the movement of the individual low melting point particles within the mixture, until the powder layer is clad to the steel backing member. Similarly, it has been found to be important that the individual particles, particularly the low melting point constituents, retain their individual and distinct identification. Wherever particles have been interagglomerated and have not been uniformly dispersed, the result thereof has been the promotion of a substantially continuous line of lakes near or adjacent to the steel backing member of such low melting point constituents. Such a continuous line of lakes promotes fracturing of the bond when a bearing is subsequently formed. It is suggested that one of the reasons for such behavior has been due to the application of temperatures above the melting point of the low melting point particles which upon application of pressure were dislocated and irregularly dispersed. For instance, when aluminum alloy powder particles, containing lead, tin or the like, are freely spread onto a steel backing member and the combination is preheated or sintered, it is well known, that subsequent application of roll pressure must take place at a temperature higher than 800° F. in order to obtain a commercially acceptable bond. As a consequence thereof, in the molten state the low melting point particles through the application of pressure and heat are caused to relocate thereby causing a weak layer near the interface as well as near the surface to some degree.

Further well known difficulties are also inherent in the free spreading of such powder particles upon the steel backing member. For example, it has been found to be extremely difficult to obtain a uniform thickness of a soft surface layer with a uniform density. Other problems, such as the low efficiency of the nipping actions of the rolls accompanied by a squirting out of the low melting particle constituents during the hot rolling step are encountered and make the free spreading method unsuitable for producing a bimetallic aluminum bearing structure.

It is therefore an object of this invention to provide a method for making a bimetallic strip suitable for the manufacture of bearings and having a compacted aluminum powder alloy layer bonded to a steel backing member and exhibiting a strong and ductile bond between the layers which may be severely deformed for bearing or other end uses.

It is a further object of this invention to provide a bimetallic structure exhibiting metallurgical characteristics which are novel and provide new and essential characteristics for a commercially suitable bearing.

It is a further object of this invention to provide a bimetallic structure composed of a high percentage of low melting point particle constituents which are uniformly dispersed therein. The dispersement is such that the final product is devoid of undesirable concentrations of such constituents near or adjacent to the bonding surface of the steel backing member.

The objects of the invention are accomplished by a method of making a bimetallic member comprising a steel backing layer and a layer of aluminum alloy powder which comprises the steps of: cold compacting the aluminum alloy powder particles into a green layer; passing at least one of the layers through a heating unit with a non-oxidizing atmosphere, and heating that layer. The layers are maintained in contact for a time and at a temperature to metallurgically bond them together, and at all times maintaining the powder layer at a temperature below the melting point of the lowest melting point powder constituent.

In accordance with another feature of the invention, there is provided a bearing structure having a steel backing layer and a compact powder layer bonded thereto; the compact powder layer is comprised of low melting point metal particles and aluminum particles; the low melting point particles therein constituting 10% to 25% of the total weight thereof and such particles establish distinct individual lakes. The aluminum particles provide a matrix surrounding the lakes and the combination provides an agglomerated dense structure.

For a better understanding of the present invention, together with other and further objects thereof, reference is had to the following description taken in connection with the accompanying drawings, and its scope will be pointed out in the appended claims.

Figure 1:
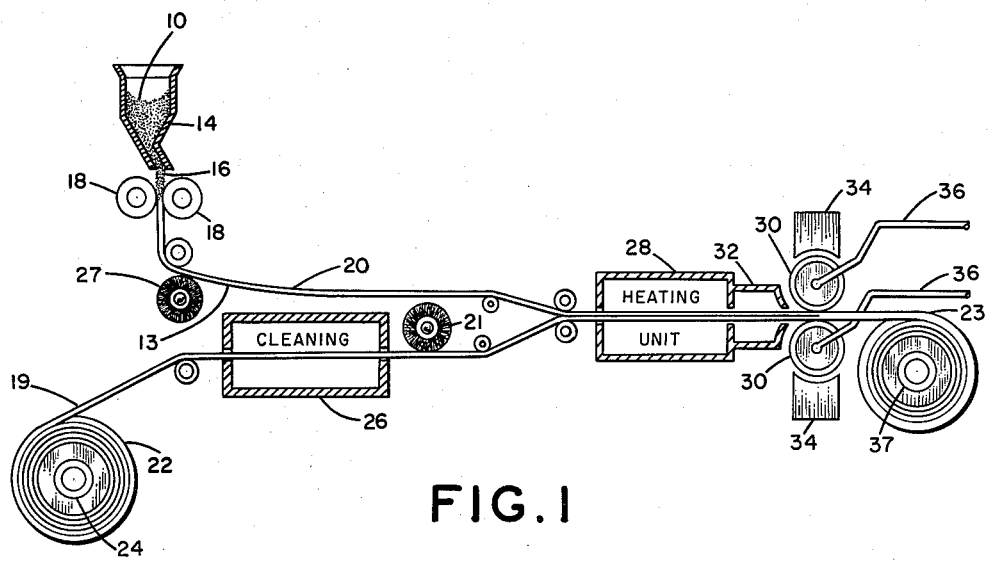
FIGURE 1 is a diagrammatic view illustrating a continuous production line for producing a bimetallic structure in accordance with the present invention.
Figure 2:
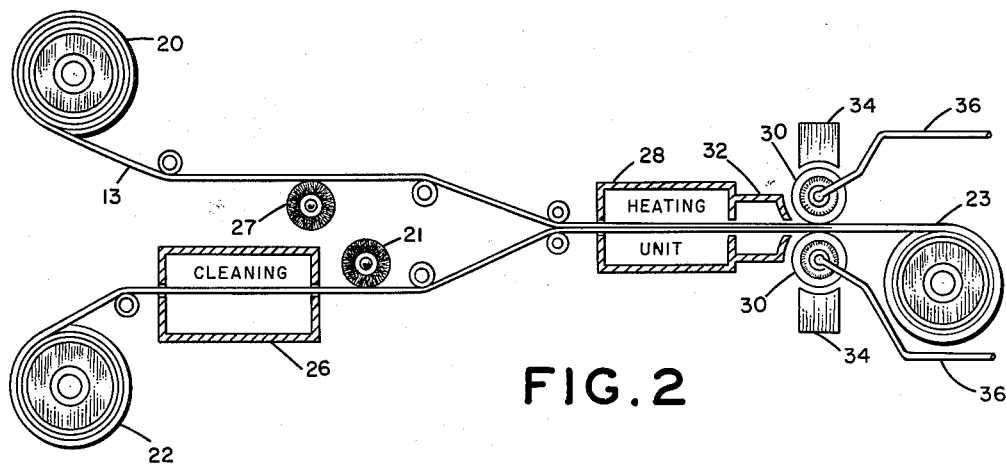
FIGURE 2 is a similar view as FIGURE 1, illustrating a step by step method, and showing the compacted metal powders in layer form and coil mounted.

Referring now to FIGURES 1 and 2, the bimetallic structure is initially formed by thoroughly mixing finely divided powder particles into a powder mixture 10. The powder mixture 10 is comprised primarily of aluminum and low melting point constituents selected from a group of metals including tin, lead or cadmium. Other metal particles such an antimony, bismuth or silicon may be added for specific requirements, for instance antimony may be used for stiffening the matrix for better load carrying characteristics. The tin, lead and cadmium particles are provided in the powder mixture in quantities from about 10% to about 25%, the latter is representative of commercial limits.

The powder mixture required for the purpose of the invention may be obtained by mechanically mixing relatively pure metal constituents with other powder particles, or by pre-alloying the particles, or by a combination of the two.

The size of the individual powder particles is not critical. Satisfactory results have been obtained by using particles in sizes ranging from 35 to 325 mesh, results with 100 mesh size have been particularly good.

Steel of the type commercially known as SAE 1010 has been found suitable as a strong backing layer 22. However, the composition of the steel is not too critical and need not be in accordance with the SAE 1010 specification. For example, a cold drawn steel, such as SAE 1018 may be used.

The composition of the steel is as follows:

|  | SAE 1010 | SAE 1018 |
| --- | --- | --- |
| Carbon | .08-.13% | .15-.20%. |
| Manganese | .30-.60% | .60-.90%. |
| Phosphor | .040% maximum | .040% maximum. |
| Sulfur | .050% maximum | .050% maximum. |

The lower carbon steel is preferred since it endures a greater rolling reduction which results in an improved bond. Also, it has a lower initial hardness and is less adversely affected by cold working.

In preparing the powder mixture 10 for the bonding operation the same is loaded into a hopper 14 which gradually releases the powder mixture 10 through a slot 16 to feed it into a gap between cold compacting rolls 18. The rolling mill 18 is rotatably driven and set up in a horizontal plane. The rolling step is performed with the rolls at room temperature to compact the particles into a self-sustaining green powder strip 20.

The steel backing layer 22 is unwound from a coil 24, and the bonding surface 19 thereof is cleaned by passing the layer through a conventional cleaning apparatus 26. Cleaning may take place by using a cleaning compound such as trichloroethylene. Thereafter the steel layer is roughened by passing a brush 21 over the surface.

The green powder layer 20 is now further processed in a continuous line operation as shown in FIGURE 1. Alternatively, the layer 20 may be cut into slabs, or rolled onto a coil for subsequent fabrication as illustrated in FIGURE 2. In either case, the bonding surface 13 of the powder layer is first roughened by a brush 27. The brushing also has the effect to remove a good portion of the low melting point constituents from the interface. The green powder layer 20 is then aligned with the steel backing layer 22 and the combined structure 23 is passed through a temperature controlling type of heating unit 28, such as an induction heating unit, or a furnace using a reducing atmosphere. The heating unit 28 heats the bimetallic structure 23 to a temperature which is below the melting point of the lowest melting point powder constituent. This may be accomplished by passing the bimetallic structure 23 through the unit, or by passing only the steel backing layer therethrough and heating the green powder layer by bringing it in heat transfer contact with the backing layer after the latter has passed through the heating unit. The structure 23 thus heated, is then moved through a substantially gas-tight chute 32 and passed between preheated and rotatable rolls 30, which exert a sufficient roll pressure onto the powder layer and backing layer to securely sinter and bond the powder particles to each other and to the backing layer.

A heating element 34 is attached to each one of the rotatably driven rolls 30 to preheat the same to a temperature below the melting point of the lowest melting point constituent. During operation, the rolls are maintained at such temperature by intermittently bringing the rolls in heat transfer relationship with a cooling element 36, for instance water, if the temperature of the rolls approaches the melting temperature of the lowest melting point constituent. Further, the rolls 30 are adjusted to cause a considerable reduction in the thickness of the steel backing layer 22 and a substantial reduction in the thickness of the compact powder layer 20. More particularly, the steel backing member is reduced 5% to 50% and the thickness of the powder layer 40% to 70%. Since the temperature of the bimetallic structure 23 and the temperature of the rolls 30 is maintained at a point below the melting temperature of the lowest melting point constituent, rolling the composite structure does not cause the low melting point constituent to be squirted out as is otherwise the case. This results in the low melting point constituent being present in the finished structure in the form of a large number of solidified lakes surrounded by the aluminum, and there is no distinct layer of the low melting point material adjacent the steel layer which would establish a weak zone apt to fracture upon subsequent severe forming into a round bearing member.

After the combined structure 23 emerges from the rolls it may be quenched by any suitable means (not shown) and thereafter the bimetallic structure 23 is conveniently rolled onto a spool 37.

Figure 3:
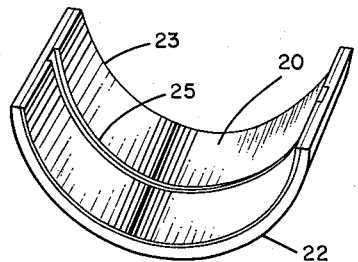
FIGURE 3 is a perspective view of a bimetallic member produced in accordance with the invention.

The sleeve bearing as shown in FIGURE 3 is fabricated from the finished structure 23 by appropriately cutting same into predetermined sizes and by deforming each piece about 180° and working the soft surface 20 to provide, for instance, a lubricating groove 25.

In FIGURES 4-7 there is illustrated photomicrographically to illustrate the improvement afforded by this invention with respect to the bimetallic sleeve bearing structure as shown by way of example in FIGURE 3. To avoid innumerable illustrations, the photomicrographs have been limited to show a bimetallic member in accordance with the invention in which the low melting point material is lead. However, it is obvious that tin or cadmium powder particles individually or in combination with lead particles may be used instead.

Figure 4:
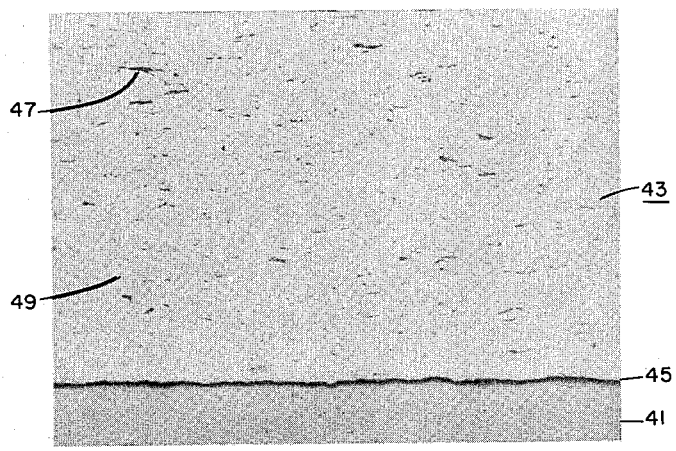
FIGURE 4 is a photomicrograph at a magnification of one hundred times of a bimetallic structure in section taken perpendicular to the longitudinal axis of the structure. This view illustrates compacted powder particles bonded to a steel layer, wherein the lead particles comprise 10% of total particle weight.
Figure 5:
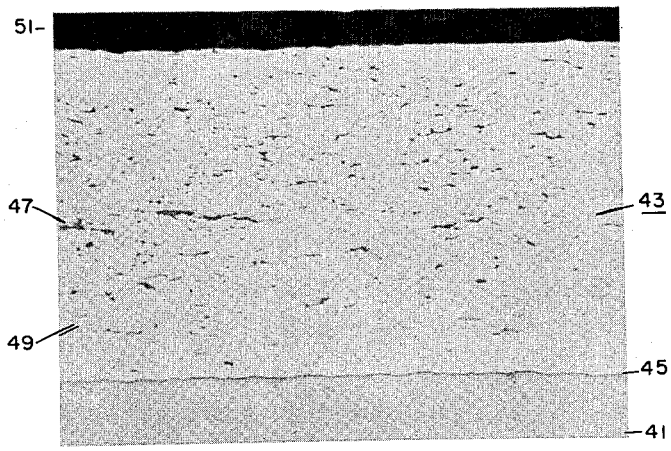
FIGURE 5 is a photomicrograph similar to FIGURE 4 with the exception that the composition of the particles includes 15% lead.
Figure 6:
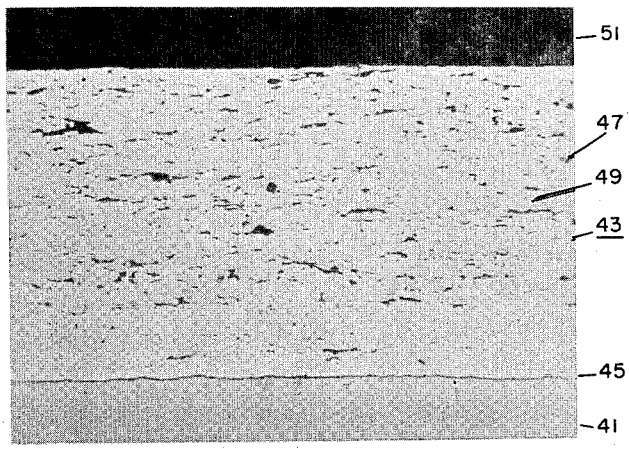
FIGURE 6 is a photomicrograph similar to FIGURE 4 with the exception that the composition of the particles comprises 25% lead.
Figure 7:
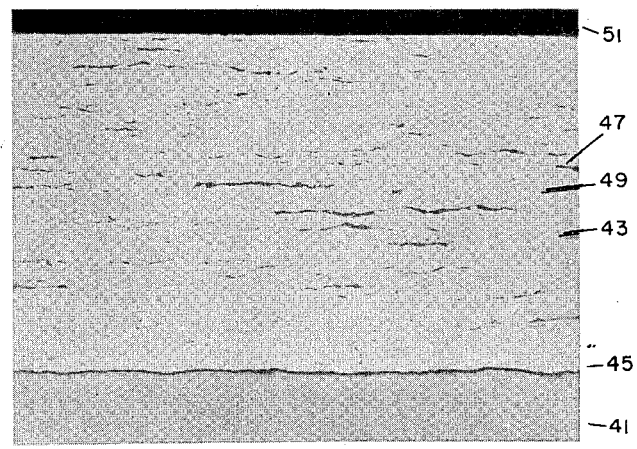
FIGURE 7 is a similar view as FIGURE 4 showing a photomicrograph taken parallel to the longitudinal axis of the bimetallic strip and illustrating a 10% lead content.

In FIGURES 4 to 7 there is shown a bimetallic structure in accordance with this invention. The structure is comprised of a steel backing layer 41 and a green powder layer 43 bonded thereto. A common interface or bonding area is shown at 45. In FIGURE 4 the powder layer 43 is comprised of 10% lead with respect to the total powder particle weight, the balance being primarily aluminum, while in FIGURES 5 and 6 the powder layer 43 comprises 15% and 25% lead respectively. In the drawings the lead lakes are identified by 47 and the aluminum by 49. It should be noted that the dark portion 51, FIGURES 5 to 7, is not part of the bimetallic strip but is a Bakelite structure used for mounting the specimen for the photomicrograph and has nothing to do with the invention.

As is readily apparent from the photomicrographs the individual low melting point particles retain their identity of distinct particles, and further the lead particles have not combined with the aluminum powder particles to form compounds or solid solution constituents. But instead, the lead particles provide in combination with each other, distinct individual lakes surrounded by an aluminum matrix which agglomerates the particles in a dense structure. The structure is unusually dense and tests have indicated a density well above 90% with respect to absolute density. A density of 99% can be obtained.

It will be further appreciated from the photomicrographs that the low melting point lead is uniformly dispersed throughout the powder layer. Most importantly, it is quite obvious that there is not even a minute accumulation of appearance of lakes made up of low melting point materials near or adjacent to the interface 45. Particular attention is directed to the fact that despite the quantitative difference in lead there is no substantial difference in the appearance of the bimetallic strip comprising 10% lead content as compared with a 25% lead content. Similarly, neither structure is encumbered with the undesirable characteristics as hereinbefore discussed.

FIGURE 7 shows that the little lakes of lead are elongated in the plane of the strip and the axis of elongation of the individual lakes are oriented substantially parallel to each other. In FIGURES 4 to 6 there is shown that the dimension of the lakes in the plane of the strip and transverse to the axis of elongation is small as compared to the dimension along the axis of elongation. Further, the axis of elongation of the little lead lakes is substantially parallel to the longitudinal axis of the strip. That is to say, the shape of the lead lakes are substantially perpendicularly elongated with respect to the application of rolling pressure upon the layer but substantially and uniformly spaced away from the bonding interface 45.

While there have been described what at present are considered to be the preferred embodiments of this invention, it will be obvious to those skilled in the art that various changes and modifications may be made therein without departing from the invention, and it is aimed, therefore, in the appended claims to cover all such changes and modifications as fall within the true spirit and scope of the invention.

We claim as our invention:

1. A bimetallic bearing structure comprising: a steel backing layer and a compact powder layer bonded thereto; said powder layer comprising intermixed low melting point metal particles and aluminum particles, said low melting point metal particles therein constituting about 10% to about 25% of the total weight thereof and establishing distinct individual lakes; said aluminum particles establishing a matrix surrounding said lakes and agglomerating both said types of particles into a dense structure; said low melting point metal particles having a melting point below the melting point of said aluminum particles.

2. A bimetallic bearing structure as set forth in claim 1, wherein substantially each of said lakes is elongated substantially along the plane of said structure and its axis of elongation is substantially parallel with respect to the axis of elongation of the other lakes.

3. A bimetallic bearing structure as set forth in claim 2, wherein the dimension of each of said lakes along the plane of said structure and transverse to said axis of elongation is small as compared to the dimension along said axis.

4. A bimetallic bearing structure comprising: a steel backing layer and a compact powder layer bonded thereto; said powder layer comprising intermixed low melting point metal particles and aluminum particles; said low melting point metal particles therein comprising at least 10% of the total weight thereof and establishing distinct individual lakes; said lakes being longitudinally elongated and oriented substantially parallel with respect to the longitudinal axis of said layers; said aluminum particles establishing a matrix surrounding said lakes and agglomerating said low melting point particles into a dense structure; said low melting point metal particles having a melting point below the melting point of said aluminum particles.

5. A bimetallic bearing structure comprising: a steel backing layer and a compact powder layer bonded thereto; said powder layer comprising intermixed metal powder particles having a melting point below 650° F. and aluminum particles; said low melting point metal particles therein constituting about 10% to about 25% of the total weight thereof and establishing in combination distinct individual lakes; and said aluminum particles establishing a matrix surrounding said lakes and agglomerating both of said types of particles into a dense structure; said particles providing a compact layer having a density of 90 to 99% with respect to absolute density.

6. A bimetallic bearing structure as set forth in claim 4, wherein said constituents are uniformly dispersed, irrespective of minute variations in density.

7. A bimetallic bearing structure comprising: a steel backing layer; a layer of densely compacted metal particles bonded to said steel backing layer; said metal particles being primarily comprised of aluminum and including 10 to 25% tin; said tin particles being uniformly dispersed throughout said layer establishing distinct individual lakes therein; said bearing exhibiting photomicrographically a bonding surface, between said compacted powder and said backing member, free of a tin layer.

8. A bimetallic bearing structure comprising: a steel backing layer; a layer of densely compacted particles bonded to said steel backing layer; said metal particles being primarily comprised of aluminum and including 10 to 25% cadmium; said cadmium particles being uniformly dispersed throughout said layer establishing distinct individual lakes therein; said bearing exhibiting photomicrographically a bonding surface, between said compacted powder and said backing member, free of a cadmium layer.

9. A bimetallic bearing structure comprising: a steel backing layer; a layer of densely compacted metal particles bonded to said backing layer; said metal particles being primarily comprised of aluminum and including 10 to 25% lead; said lead particles being uniformly dispersed throughout said layer establishing distinct individual lakes therein; said bearing exhibiting photomicrographically a bonding surface, between said compacted powder and said backing member, free of a lead layer.

10. The method of making a bimetallic structure including a steel backing layer and a layer of compacted metal powder particles suitable for the manufacture of bearings, comprising the steps of: cold compacting finely divided bearing metal particles into a green powder layer; passing said compacted powder layer together with said steel backing layer through a heating unit having a non-oxidizing atmosphere and heating said layers therein at a temperature below the melting point of the lowest melting point metal powder particle; maintaining said layers under pressure in contact for a time and at a temperature sufficient to metallurgically bond them together.

11. The method as set forth in claim 10, wherein the temperature within the heating unit is below the melting point of the lowest melting point alloy constituent.

12. The method of making a bimetallic structure suitable for the manufacture of bearings, comprising: a steel backing layer and a layer of metal powder particles, said powder including metal particles selected from a group of aluminum, lead, antimony, tin, cadmium, bismuth and silicon; cold rolling said particles into a compact green powder layer; placing said powder layer together with said steel backing layer into a heating unit having a non-oxidizing atmosphere and heating said layers therein at a temperature below the melting point of the lowest melting point metal powder particle; maintaining said layers in pressure contact for a time and at a temperature sufficient to metallurgically bond them together; maintaining a uniform dispersement of said particles throughout aforestated process.

13. The method of making a bimetallic structure suitable for the manufacture of bearings, comprising: a steel backing layer and a layer of metal powder particles, said powder including about 10 to about 25% metal particles selected from a group of lead, tin and cadmium and the balance aluminum; cold rolling metal powder particles into a compact green powder layer; heating said layers to a temperature below the melting point of the lowest melting point metal powder particle; passing said strips between rolls at a temperature below the melting point of the lowest melting point metal powder particle constituent, whereby said metal powder particles are elongated perpendicular to application of rolling pressure.

14. A sleeve bearing comprising a steel backing layer and a compact powder layer bonded thereto; said powder layer comprising intermixed metal powder particles having a melting point below 650° F. and aluminum particles; said low melting point metal particles therein being about 10% to about 25% of the total weight thereof and establishing in combination distinct individual lakes; and said aluminum particles establishing a matrix surrounding said lakes and agglomerating both of said types of particles into a dense structure; and substantially each of said lakes being elongated substantially along the plane of said layers and its axis of elongation being substantially parallel with respect to the axis of elongation of the other lakes; and said particles constituting in combination a compact layer having a density of 90 to 99% with respect to absolute density.

15. A sleeve bearing comprising a steel backing layer and a compact powder layer bonded thereto; said powder layer comprising intermixed metal powder particles having a melting point below 650° F. and aluminum particles; said low melting point metal particles therein constituting about 10% to about 25% of the total weight thereof and establishing in combination distinct individual lakes; said aluminum particles establishing a matrix surrounding said lakes and agglomerating both of said types of particles into a dense structure, substantially each of said lakes being elongated substantially along the plane of said layers and its axis of elongation being substantially parallel with respect to the axis of elongation of the other lakes, the dimension of each of said lakes along the plane of said layers and transverse to said axis of elongation being small as compared to the dimension along said axis; and said particles constituting in combination a compact layer having a density of 90 to 99% with respect to absolute density.

16. The method of making a sleeve bearing including a steel backing layer and a layer of compacted metal powder particles, comprising the steps of: cold compacting finely divided bearing metal particles into a green powder layer; passing said compacted powder layer together with said steel backing layer through a heating unit having a non-oxidizing atmosphere and heating said layers therein at a temperature below the melting point of the lowest melting point metal powder particle; maintaining said layers under pressure in contact for a time and at a temperature sufficient to metallurgically bond them together; cutting said layers into suitable sections; and deforming said sections arcuately.

17. A method of making a bimetallic strip having a steel backing layer and a layer of compacted metal powder particles comprising the steps of: compacting cold the metal particles into a green powder layer; heating at least one of said layers; maintaining said layers in pressure contact for a time and at a temperature sufficient to metallurgically bond them together; and at all times maintaining said powder layer at a temperature below the melting point of its lowest melting point metal powder particle.

References Cited in the file of this patent
UNITED STATES PATENTS

| 2,178,529 | Calkins et al. | Oct. 31, 1939 |
| 2,747,256 | Wyatt et al. | May 29, 1956 |

FOREIGN PATENTS

| 628,198 | Great Britain | Aug. 24, 1949 |